No. 705,482. Patented July 22, 1902.
W. A. THIERMANN.
SYSTEM OF AND APPARATUS FOR TRANSMITTING MOVEMENTS AND INDICATING THE POSITION OF INDICATORS OR THE LIKE.
(Application filed Nov. 12, 1901.)
(No Model.) 3 Sheets—Sheet 1.

No. 705,482. Patented July 22, 1902.
W. A. THIERMANN
SYSTEM OF AND APPARATUS FOR TRANSMITTING MOVEMENTS AND INDICATING
THE POSITION OF INDICATORS OR THE LIKE.
(Application filed Nov. 12, 1901.)
(No Model.) 3 Sheets—Sheet 2.

No. 705,482. Patented July 22, 1902.
W. A. THIERMANN.
SYSTEM OF AND APPARATUS FOR TRANSMITTING MOVEMENTS AND INDICATING THE POSITION OF INDICATORS OR THE LIKE.
(Application filed Nov. 12, 1901.)

(No Model.) 3 Sheets—Sheet 3.

WITNESSES:

INVENTOR.
Wilhelm August Thiermann
Richardson
ATTORNEYS.

UNITED STATES PATENT OFFICE.

WILHELM AUGUST THIERMANN, OF HANOVER, GERMANY.

SYSTEM OF AND APPARATUS FOR TRANSMITTING MOVEMENTS AND INDICATING THE POSITION OF INDICATORS OR THE LIKE.

SPECIFICATION forming part of Letters Patent No. 705,482, dated July 22, 1902.

Application filed November 12, 1901. Serial No. 82,029. (No model.)

*To all whom it may concern:*

Be it known that I, WILHELM AUGUST THIERMANN, professor at the Technische Hochschule in Hanover, a subject of the King of Prussia, Emperor of Germany, residing at 19 Oeltzenstrasse, Hanover, Germany, have invented certain new and useful Improvements in and Relating to Systems of and Apparatus for Transmitting Movements and Indicating the Position of Indicators or the Like, of which the following is a specification.

The present invention relates to a system of transmitting movements and indicator positions by means of pulsating direct current, single or polyphase alternating current. The apparatuses employed can be used jointly as transmitter and as receiver. Each apparatus essentially consists of a movable member (the rotor) and of a stationary member, (the stator.) The rotors are bipolar and have no winding. The stators have primary windings and secondary windings. The primary windings of all stators are connected with one another and are in connection with a source of electricity. The secondary windings are divided in sections, and the corresponding sections of all stators are connected with one another. The primary coils excite lines of force which travel from the stator to the rotor, passing the latter from one end to the other. Hereby the lines of force intersect those secondary coils which are in the neighborhood of the free ends of the rotor approximately at right angles. With a movement of the rotor in the apparatus used as transmitter compensating currents appear in the secondary circuit in such a manner that they effect the corresponding movement of all the rotors.

Several forms of construction of the apparatuses employed in this new system are illustrated in the accompanying drawings, in which—

Figure 1:
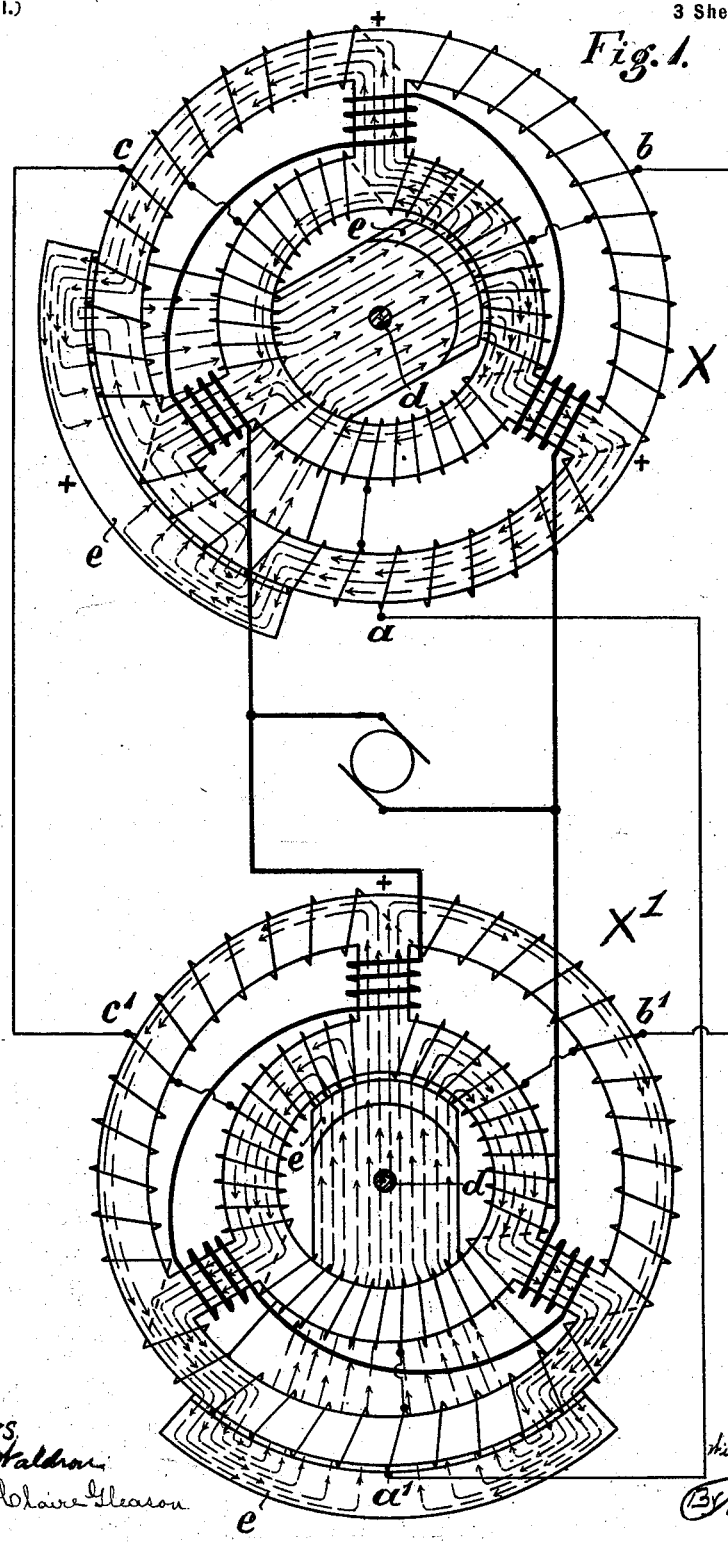
Figure 2:
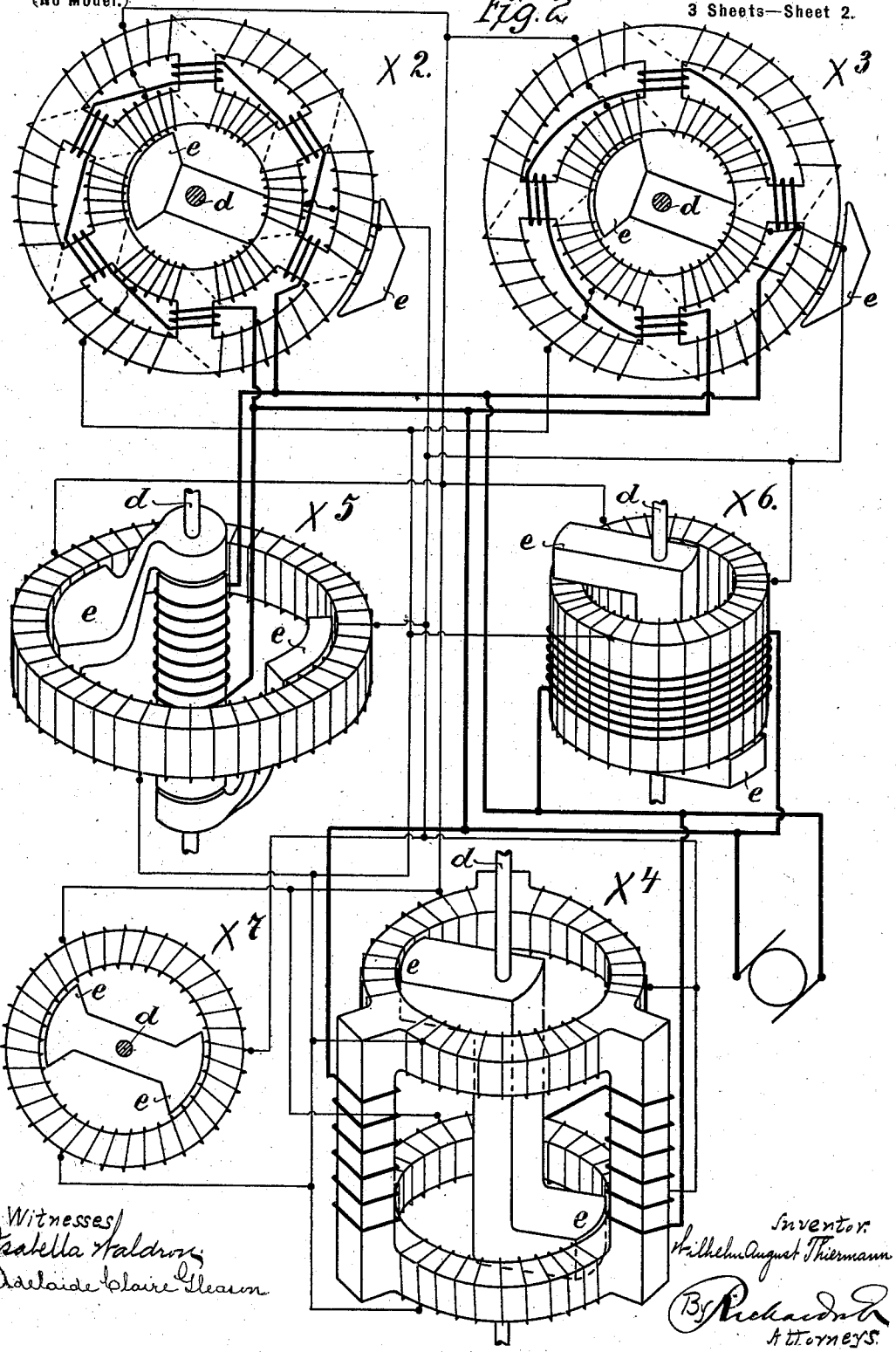
Figure 3:
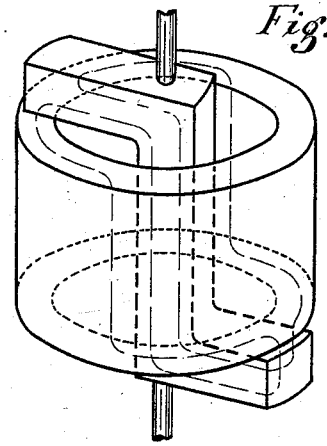
Figure 4:
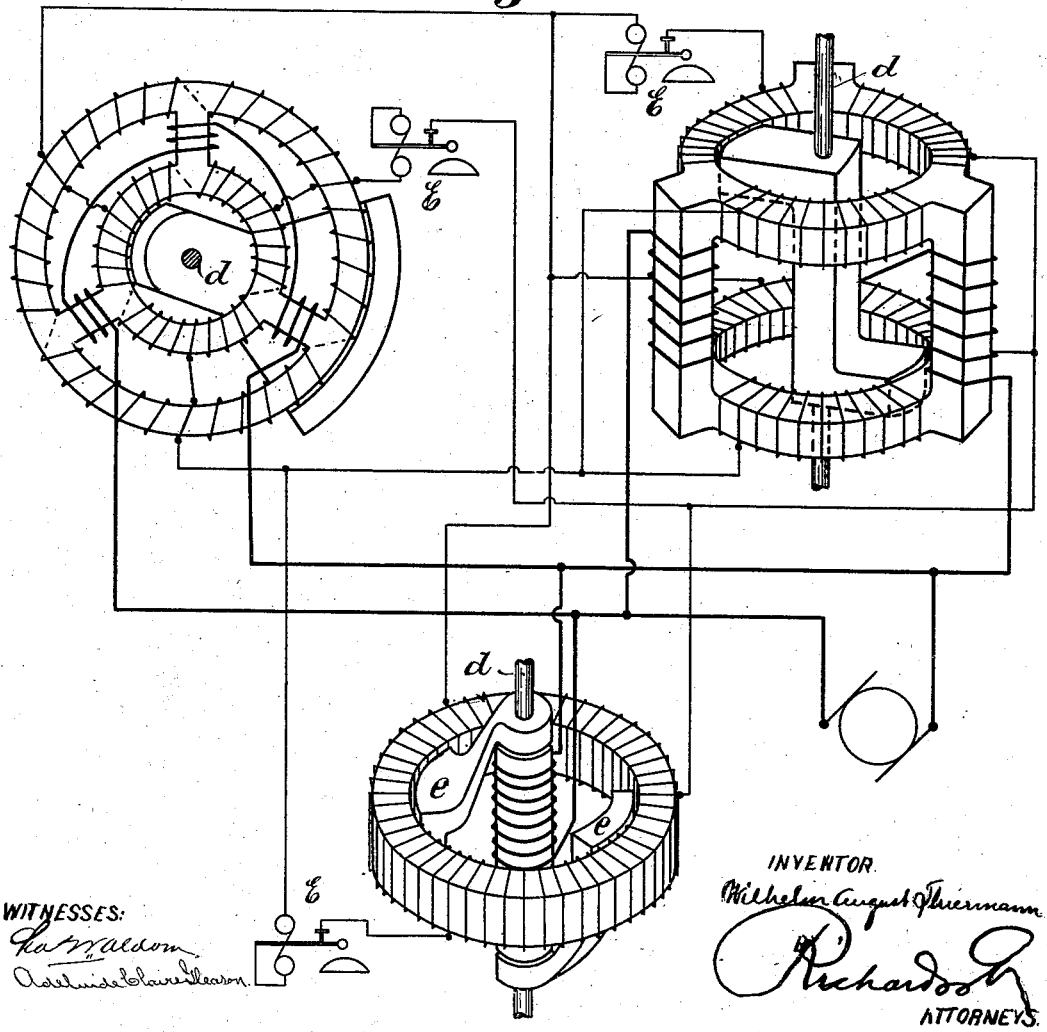

Figure 1 shows two apparatuses of the same construction connected with one another, the upper one of which is considered as the transmitter and the lower one as the receiver. The method of operation is described below. Fig. 2 illustrates, diagrammatically, partly in plan and partly in perspective view, six apparatuses of modified construction, all apparatuses being combined to a transmitting system of six stations. Fig. 3 illustrates, schematically, the path of the lines of force in the stator $X^6$ of Fig. 2. Fig. 4 represents three apparatuses combined into one system, each apparatus being in connection with a bell.

The stators of the apparatuses X and X′ in Fig. 1 consist of two concentric rings, which are connected to each other by means of three radial spokes. On the rings are placed the encircling secondary windings. Three points $a$ $b$ $c$ of those windings in the transmitter are respectively connected with three corresponding points $a'$ $b'$ $c'$ in the receiver. The primary coils of both the apparatuses wound on the spokes are connected in parallel. It is assumed that the apparatuses are supplied with single-phase alternating current. The rotors, unprovided with windings, are supported by an axle $d$, running in suitable bearings, (not shown in the drawings,) and are bipolar. Of their two pole-pieces $e$ the one coöperates with the inner ring and the other with the outer ring of the stators. The stators, which are preferably provided with grooves for receiving the windings, preferably consist, like the rotors, of iron laminæ.

Let us assume for the purpose of explaining the method of operation that the rotor of the transmitter has just been moved or shifted an impulse which is to effect during the next instant the same position of the rotor in the receiver. In consequence of the method of connecting the primary winding different poles can appear only on different rings. For instance, at the moment illustrated on the outer ring there are only positive poles and on the inner ring only negative poles. The lines of force generated by each primary winding are indicated on the drawings by four broken lines, their momentary direction being marked by the arrows. They take a path which varies according to the position of the rotor and is dependent thereon and are in a manner fixed only in their central portions by the primary windings. The manner in which their ends unite is, however, dependent on the position at that time of the corresponding rotor. From the path of the lines of force in Fig. 1 it results that the difference of potential at the end of the coil $a$ $b$ in the assumed position of the rotor is approximately equal to that at the terminals of the coil $b\,c$, but that these differences of potential are of opposite sign. The difference of potential between the ends of the coil $c\,a$ is, on the other hand, considerably smaller, even almost zero, as the windings of this coil are cut by approximately half the lines of force in one direction and by the other half of the lines of force in the opposite direction. Consequently the points $a\,b\,c$ are at different potentials. Other differences of potential exist between the points $a'\,b'\,c'$ in the receiver than those between the corresponding points $a\,b\,c$ of the transmitter which are connected with them. Compensating currents will consequently have to flow between the points $a$ and $a'$, $b$ and $b'$, $c$ and $c'$ until the points connected with each other have the same potential. This takes place when the lines of force of the magnetic field of the receiver have moved into exactly the same position as those of the transmitter. The field of magnetic force can move in this manner, however, only if the rotor also moves. The rotor does actually move as it naturally adjusts itself, so that the magnetic reluctance is a minimum. In the position of rest it consequently always connects the places where the lines of force are most dense in the outer and inner rings. If the rotors are now rotated successively into any desired number of positions, it will be found that the number of lines of force which pass through each separate secondary coil always remains unaltered, but that notwithstanding even a slight movement of the rotor correspondingly different potentials arise at the points $a$, $b$, and $c$. This happens because the actions of the lines of force within one or two coils reduce or neutralize each other more or less. It will be seen, further, that the lines of force in opposite parts of the inner and outer ring have the same direction. The lines of force will therefore mutually repel each other, and consequently their passage into the air-space between the two rings will be avoided. Consequently the leakage of the apparatus will be very slight.

The apparatuses $X^2$ and $X^3$ differ from the above only in the number of the spokes on which the primary windings are wound.

The apparatus $X^4$ can be understood without further explanation from the description of the apparatus shown in Fig. 1 if it is assumed that the two rings of the latter apparatus are removed from a common plane into parallel planes. The spokes then will not be radial, but parallel, to the axle $d$. The rotor then has somewhat the form of a Z.

In the apparatuses according to Figs. 1 to 4 there may also be a single secondary winding, which is then wound over both rings as a common core.

In the apparatus $X^5$ the stator consists of two separated parts. The immovable primary coil is arranged with its axis vertical to the plane of the secondary-wound ring. The rotor consists merely of the two pole-pieces $e$, connected by the axle $d$.

In the apparatus $X^6$ the primary and secondary coils are wound on a hollow cylinder, and the rotor has again the form of a Z. Within the body of the hollow cylinder lines of force are produced which are parallel to the axis of the cylinder. A part of these lines of force travels from one end of the cylinder through the Z-shaped rotor to the other end of the cylinder. Said lines of force intersect those secondary coils, which are in the neighborhood of the ends of the Z-shaped rotor, approximately at right angles.

The method of operation of the apparatuses $X^2\,X^3\,X^4\,X^5\,X^6$ is exactly the same as that explained for the apparatus according to Fig. 1, and they also have, notwithstanding their different form, the same essential characteristics. The rotors are bipolar and have no windings. Moreover, the primary coils of the immovable stators produce lines of force which travel from the stator to both ends of the rotor, passing the latter from one end to the other. Hereby the lines of force intersect those secondary coils which are in the neighborhood of the free ends of the rotor approximately at right angles. Finally, the rotors in the position of rest always connect with each other those places where the lines of magnetic force are most dense. It is, however, also possible to make use of an apparatus which has only one winding, (see $x^7$,) if the other apparatuses of the system, or at least one of them, are provided with two windings, one of which is connected to a source of electricity and acts as a primary coil. This arrangement is the subject of a divided application.

A bell is preferably inserted in the wires near each apparatus, which is then arranged so that it only sounds when the compensating currents momentarily occur on the displacement of the transmitter, while when the receiver has been subsequently adjusted it leaves off ringing. In this manner every alternation in the position of the indicator is instantaneously made known by sound.

Fig. 4 represents three apparatuses $X'\,X^4\,X^5$ combined into one system, each apparatus being in connection with a bell E. The bell is placed near the apparatus and may be arranged in any of the lines which connect the sections of the secondary winding with the corresponding sections of the other stators.

In the new system transmitter and receiver can constantly exchange functions. They may be excited with primary current or not, and the movement of one apparatus is in all cases transmitted synchronously to the others. Moreover, as already stated at the commencement, it is of no consequence whether the primary coils are supplied with pulsating direct current, single or polyphase alternating current. The indicators of the apparatuses can be fixed direct on the rotors, so that any further mechanical gearing (pawls, gearwheels, and the like) is obviated. Finally, there may be mentioned as special advantages of this system that current-conducting movable members are nowhere present and that the number of adjustment or stopping places is unlimited and independent of the number of connecting-wires.

Having now described my invention, what I claim as new, and desire to secure by Letters Patent, is—

1. In a system for the transmission of movements and positions of indicators by means of electric currents, the combination of apparatuses, each consisting of a bipolar rotor, having no coils, and of a stator, having primary and secondary coils, the primary coils of the stators being connected with one another and also to a source of electricity, while the secondary windings of all stators are connected at corresponding points, substantially as shown and described.

2. In a system for the transmission of movements and positions of indicators by means of electric currents, the combination of apparatuses, each consisting of a bipolar rotor, having no coils, and of a stator, having primary and secondary coils, the primary coils of the stators being connected with one another and also to a source of electricity, while the secondary windings of all stators are connected at corresponding points each apparatus being provided with a bell, which sounds only when compensating currents occur and which stops ringing, when the rotor is adjusted, substantially as shown and described.

In witness whereof I have hereunto set my hand in presence of two witnesses.

WILHELM AUGUST THIERMANN.

Witnesses:
PAUL RICHARD FRÜCHTENICHT,
JOHANNES JÜRGEN LASSEN.